Sept. 8, 1964          E. M. MAEHREN          3,147,989

STEERING MECHANISM FOR WAGONS AND THE LIKE

Filed Oct. 2, 1962          2 Sheets-Sheet 1

INVENTOR.
EDMUND M MAEHREN
BY
Carwell Lagaard & Wicks
ATTORNEYS

Sept. 8, 1964 E. M. MAEHREN 3,147,989
STEERING MECHANISM FOR WAGONS AND THE LIKE
Filed Oct. 2, 1962 2 Sheets-Sheet 2
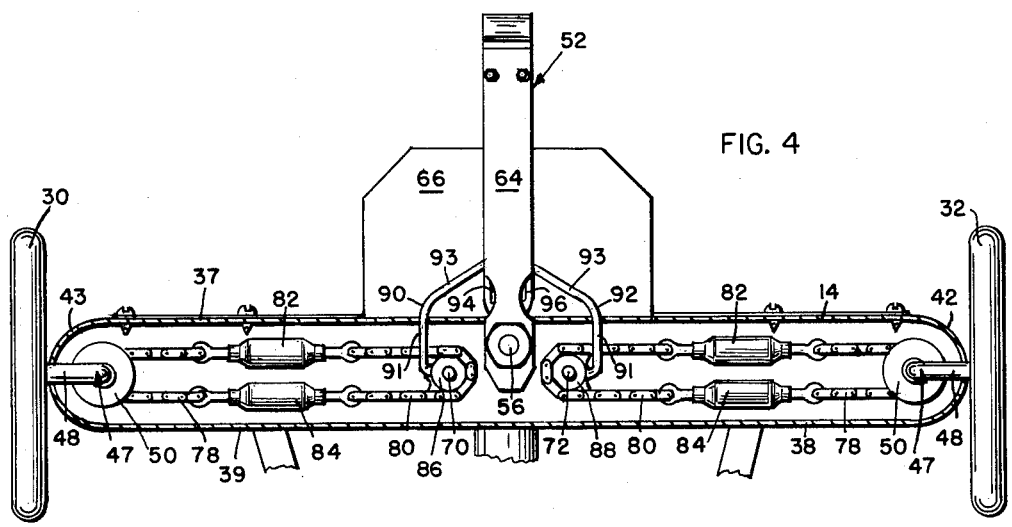
FIG. 4
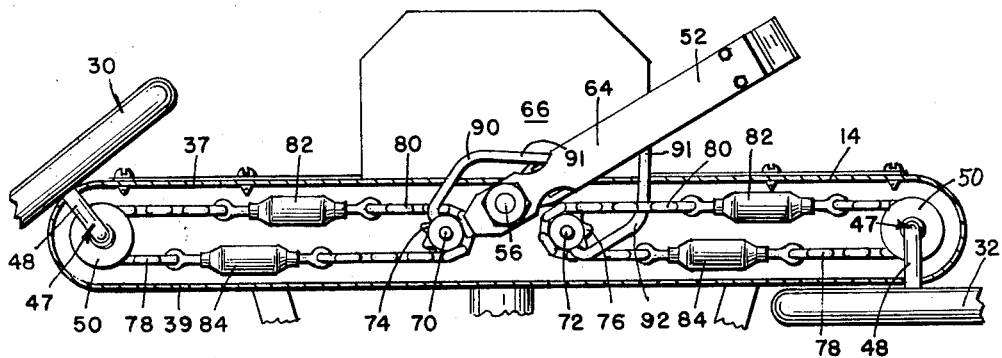
FIG. 5
FIG. 6
INVENTOR.
EDMUND M. MAEHREN
BY
Caswell Lagaard & Wicks
ATTORNEYS

United States Patent Office 3,147,989
Patented Sept. 8, 1964

3,147,989
STEERING MECHANISM FOR WAGONS
AND THE LIKE
Edmund M. Maehren, Denham, Minn.
Filed Oct. 2, 1962, Ser. No. 227,876
4 Claims. (Cl. 280—103)

This invention relates to a new and improved means for steering a wagon or other tractor-drawn implement; in particular, the invention concerns novel structure adapted to permit the towing of wagons and the like in soft ground in such a manner as to eliminate or greatly reduce the lateral skidding of the wheels during the turning movements of the wagon.

It is a broad object of this invention to provide a steering mechanism for wagons and the like characterized by novel and improved front wheel geometry.

Another object of this invention is to provide a novel wagon that can be easily towed in soft ground without the likelihood of excessive lateral skidding of the front wheels during turning movements.

Another important object of this invention is to provide in the steering mechanism of a wagon, novel structure adapted to align the front wheels in a non-parallel manner during certain periods in the steering movement to reduce lateral skidding of the front wheels and permit turns of a shorter radius than heertofore has been achieved by conventional design wagons.

Yet another object of this invention is to provide a new and improved wagon construction that is easy to manufacture, dependable in operation and extremely rugged.

These and other objects and advantages of the invention will become apparent from the following description and accompanying drawings wherein an illustrative embodiment of the invention is shown and described.

In the drawings:

FIGURE 4 is a bottom view of the forward wheel mounting structure forming part of the invention, with the cover plate removed therefrom for purposes of clarity;

FIGURE 5 is a view similar to FIGURE 4 showing the wheels in a turning position; and FIGURE 6 is an enlarged fragmentary top plan view of certain features forming part of the invention.

Figure 1:
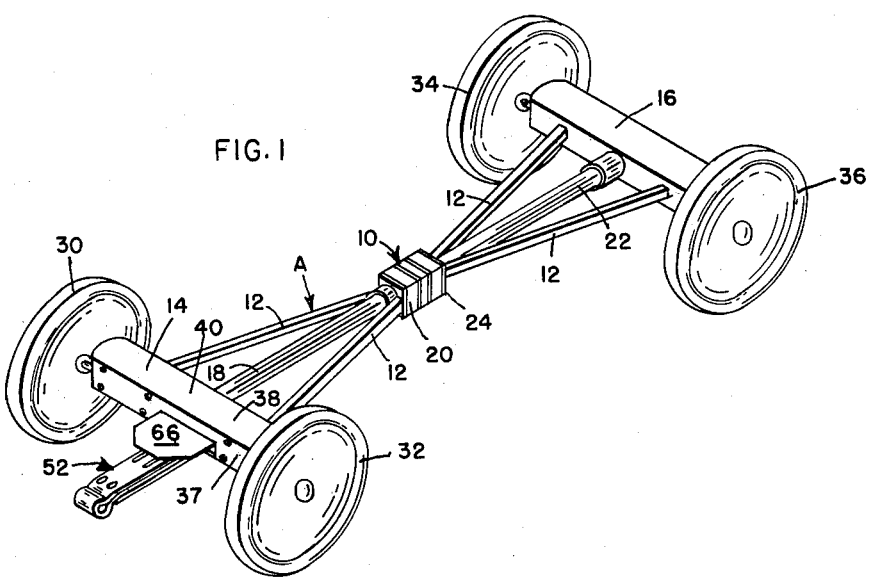
FIGURE 1 is a perspective view of a wagon embodying the structural features of my invention.

Turning now to the drawings, the invention, represented in its entirety by the reference character A, includes a central X-shaped frame 10 made up of diagonal bracing members 12 that extend inwardly in a converging manner from the forward and rear wheel carrying members 14, 16. As indicated in FIGURE 1, bracing members 12 extending rearwardly from member 14 join a hollow central longitudinal member 18 by means of a connecting bracket 20. Similarly bracing members 12 extending forwardly from members 16 join a hollow central longitudinal member 22 by means of bracket 24. Means provided for coaxially joining longitudinal members 18, 22 include a central elongated support (not shown) slidably contained within members 18, 22 and held therein by suitable locking means (not shown).

Figure 2:
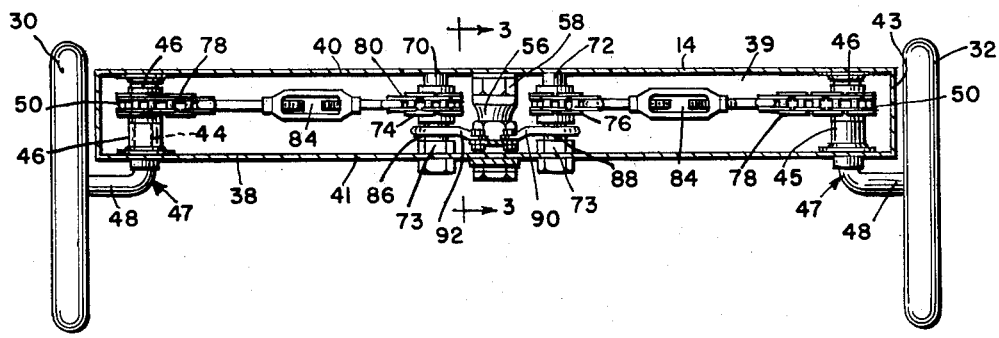
FIGURE 2 is front elevational view, partially in section, taken generally along the line 2—2 of FIGURE 3.

Wheels 30, 32 are mounted on the forward end of the wagon A and wheels 34, 36 are mounted on the rear end thereof. Considering now the pivotal features of my novel steering mechanism, FIGURE 2 shows a box-like frame 38 forming the forward wheel carrying member 14. Frame 38 consists of a pair of vertically spaced transverse generally horizontal top and bottom plates 40, 41 connected at their ends and at their sides by front and rear plates 37, 39 and generally curved end plates 42 and 43. Spaced inwardly from side plates 42, 43 are a pair of wheel supporting hollow vertical trunnions 44, 45 adapted to rotatably carry the vertical legs 46 of wheel shafts 47. The horizontal axles 48 of wheel shafts 47 terminate in mounting engagement with wheels 30, 32. Intermediate the length of each of the vertical legs 46 between plates 40, 41 of frame 38 is a sprocket gear member 50 mounted for rotation in a horizontal plane along with each of the legs 46 of wheel shafts 47.

Figure 3:
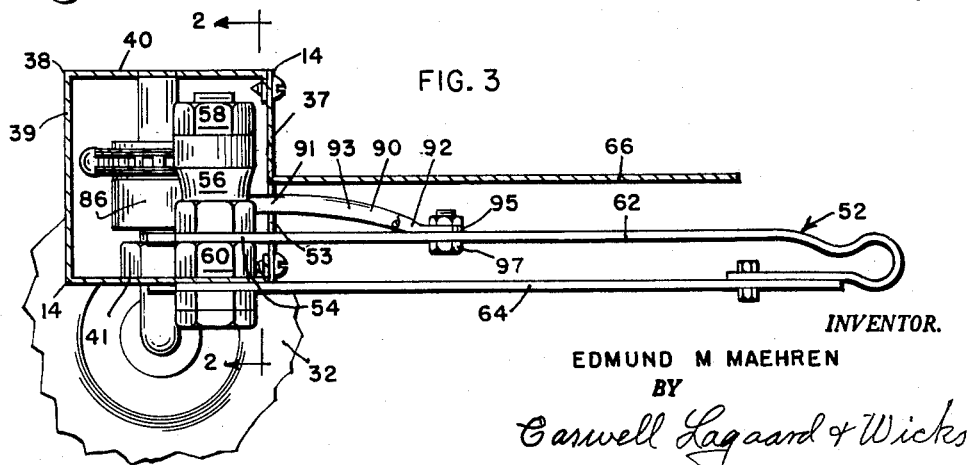
FIGURE 3 is an enlarged fragmentary view, partially in section, taken generally along the line 3—3 of FIGURE 2.

Carried centrally by frame 38 and extending forwardly therefrom is a tongue or draw bar 52. A slotted central horizontal aperture 53 in front plate 37 is provided through which tongue 52 extends for connection at its rear end 54 with a vertical bolt assembly 56. Bolt assembly 56 is equipped with locking nuts 58 and spacers 56 adapted to permit the free rotation of tongue 52 about its vertical axis. As shown in FIGURE 3, tongue 52 is constructed of an upper elongated plate 62 which overlies in a closely spaced parallel manner lower plate 64 of the same general length and width. The rear end of lower plate 64 is held in a pivotally allowable manner against the lower surface of bottom plate 41 by bolt assembly 56 while the rear end of upper plate 62 extends through aperture 53 into pivotal engagement with that part of bolt assembly 56 within frame 38. A forwardly extending horizontal shield 66 is attached to front plate 37 in close parallel relation to tongue 52 and aperture 53. Shield 66 prevents physical injury to the slidable connection between operating arms 90, 92 and tongue 52 and also serves as a weather protector.

Carried within frame 38 in closely spaced equally distant relation to the longitudinal centerline of wagon A are a pair of vertical steering posts 70, 72. Each post 70, 72 is adapted by suitable mounting means 73 for rotation about their respective vertical axis and they are also in transverse register with the vertical axes of trunnions 44, 45 which carry wheel shafts 47 in the manner previously described. Rigidly attached to and rotatable with posts 70, 72 are sprocket gear members 74, 76, which are in vertical alignment with sprocket gear members 50 carried by legs 46 of wheel shafts 47. Operatively connecting sprocket gear members 50 and sprocket gear members 74, 76 are sprocket chains 78, 80. Each sprocket chain 78, 80 is equipped with a turnbuckle 82, 94 to provide suitable means for adjusting their length and correcting the tension thereof to insure optimum results.

Located below each sprocket gear member 74, 76 on posts 70, 72, respectively, are fixed collars 86, 88 adapted for rotation with posts 70, 72. Connected to the outer transverse surface of each collar 86, 88 is an operating arm 90, 92. Operating arms 90, 92, symmetrical about the longitudinal centerline of wagon, each have a forwardly extending section 91 attached at their rear ends to collars 86, 88 and a forwardly converging section 93. The forward ends 95 of arms 90, 92 are slidably contained for longitudinal sliding movements within transversely spaced longitudinally extending slots 94, 96 of upper plate 62 of tongue 52. Suitable means 97 serve to hold arms 90, 92 in slidable engagement with plate 62, as shown in FIGURES 3 and 6.

FIGURE 5 illustrates the particular reasons for and advantages of the structural combination hereinbefore described. In the ordinary wheeled vehicle of the class described, parallelism between the front wheels at all points in the turning sequence is assured by a rigid tie bar connecting the front wheels which are mounted upon conventional vertical king pins. In the present device, the arrangement of the sliding connection between operating arms 90, 91 and tongue 52 permits the inner wheel (the wheel adjacent the end of the tongue during a turn) to turn more sharply in the direction of the curve. This is illustrated in FIGURE 5 wherein tongue 52 is rotated to the extreme right resulting in the rotation of wheel 30 to a position almost parallel to frame 38 while wheel 52 (the wheel on the outside of the turning radius) remains in the conventional sharply angled position but not swung over as sharply as wheel 30. Besides permitting a shorter radius turn, this functional result also inhibits the lateral movement or skidding of the wheels when the wagon is being drawn through soft or muddy ground. Therefore less resistance is encountered to the pull of the wagon and correspondingly less power is consumed.

The foregoing results are obtained by the positioning of the rear of arms 90, 91 upon the outer transverse periphery of collars 86, 88 and slidably containing the forward ends thereof within slots 94, 96 longitudinally positioned on each side of the center line of tongue 52. The geometry thus obtained enables the inner wheel to be angled more sharply with respect to the turning radius than the outer wheel. It can be seen that the differential or parallelism is accentuated with an increase of the angle which the tongue describes with respect to the longitudinal centerline of the wagon. Thus, when a curve of large radius is described during a turn the wheels are nearly parallel while during a sharp turn the inside wheel is sharply inclined to the outer wheel.

It is believed that the invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation with the purview of the invention as defined in the appended claims.

I claim:

1. In steering mechanism for a wagon, a transverse front wheel carrying frame, a pair of generally vertical wheel shafts rotatably carried each adjacent an end of said frame, said wheel shafts each including axle means adapted for mounting front wheels thereon, a pair of steering posts rotatably mounted within said frame in spaced inward relation to and remote from said wheel shafts, means rotatably connecting each of said steering posts to the one of said wheel shafts nearest thereto, a forwardly extending tongue pivotally carried by said frame between said steering posts, and a pair of transversely spaced arms each connected to a separate one of said steering posts and rotatable therewith, each of said arms having a forwardly extending rear end section and a laterally inwardly converging front end section, the rear end sections of said arms being generally parallel to each other when the tongue is in a straight ahead position and being approximately equivalent in length to the front end sections of said arms, the front end sections of said arms being slidably connected at their forward ends to said tongue.

2. The steering mechanism of claim 1 wherein said tongue is equipped with laterally spaced longitudinal slots and wherein said arms each are connected at their forward ends to a separate one of said slots whereby to slidably engage the same.

3. In a non-self propelled wagon of the type having a longitudinal frame and front and rear wheels, the improvement consisting of a rigid transverse forward wheel carrying frame, said transverse frame having a generally hollow elongated body with a front and a rear panel, said front panel having an elongated slot therein, a first vertical wheel shaft rotatably mounted adjacent one end of said transverse frame and carried therewithin, a second vertical wheel shaft rotatably mounted adjacent the opposite end of said transverse frame from said first wheel shaft and carried therewithin, a first vertical steering post rotatably mounted within said transverse frame in closely spaced lateral relation with the longitudinal centerline of said wagon and on the same side thereof as said first wheel shaft, a second vertical steering post rotatably mounted within said transverse frame in closely spaced lateral relation with the longitudinal centerline of said wagon and on the same side thereof as said second wheel shaft, means operatively connecting said first wheel shaft with said first steering post whereby to transmit rotational movements therebetween, means operatively connecting said second wheel shaft with said second steering post whereby to transmit rotational movements therebetween, an elongated forwardly extending tongue pivotally mounted at its rear end for rotation about a vertical axis intermediate said steering posts and extending forwardly from said transverse frame through the slot in the front panel thereof, said tongue having a pair of longitudinally extending laterally spaced slots on each side of the centerline thereof, a first operating arm connected at its rear end to and rotatable with said first steering post and slidably engageable at its forward end with the slot in said tongue in lateral adjacency thereto, and a second operating arm connected at its rear end to and rotatable with said second steering post and engageable at its forward end with the slot in said tongue in lateral adjacency thereto, said operating arms extending forwardly from said transverse frame into engagement with said tongue through the slot in the front panel of said transverse frame.

4. The structure described in claim 3 wherein a forwardly extending horizontal shield is secured to the front panel of said rigid transverse forward wheel carrying frame, said shield being in close parallel relation to said tongue and to the elongated slot in the said front panel of said transverse frame.

References Cited in the file of this patent

UNITED STATES PATENTS

| 655,660 | Reenstierna | Aug. 7, 1900 |
| 2,179,189 | Kjos | Nov. 7, 1939 |
| 2,523,790 | Thiel | Sept. 26, 1950 |

FOREIGN PATENTS

| 730,558 | Germany | Jan. 14, 1943 |
| 827,227 | Great Britain | Feb. 3, 1960 |
| 1,228,837 | France | Sept. 2, 1960 |